US008713698B2

(12) United States Patent
Adachi

(10) Patent No.: US 8,713,698 B2
(45) Date of Patent: Apr. 29, 2014

(54) DATA COMMUNICATION APPARATUS, METHOD OF CONTROLLING THE SAME, PROGRAM, AND STORAGE MEDIUM

(75) Inventor: Tomoko Adachi, Kawasaki (JP)

(73) Assignee: Canon Kabushiki Kaisha (JP)

( * ) Notice: Subject to any disclaimer, the term of this patent is extended or adjusted under 35 U.S.C. 154(b) by 1104 days.

(21) Appl. No.: 12/266,729

(22) Filed: Nov. 7, 2008

(65) Prior Publication Data

US 2009/0133127 A1 May 21, 2009

(30) Foreign Application Priority Data

Nov. 15, 2007 (JP) ................................ 2007-296684

(51) Int. Cl.
*G06F 7/04* (2006.01)
(52) U.S. Cl.
USPC .................... 726/27; 705/51; 705/57; 705/59
(58) Field of Classification Search
USPC ................................... 705/51, 57, 59; 726/27
See application file for complete search history.

(56) References Cited

U.S. PATENT DOCUMENTS

| | | | |
|---|---|---|---|
| 7,607,131 B2 * | 10/2009 | Oe et al. ......................... | 718/102 |
| 7,689,512 B2 * | 3/2010 | Hase et al. ...................... | 705/59 |
| 7,757,937 B2 * | 7/2010 | Akiba ............................ | 235/375 |
| 7,850,084 B2 * | 12/2010 | Yamamoto .................... | 235/454 |
| 2002/0077988 A1 * | 6/2002 | Sasaki et al. .................... | 705/59 |
| 2003/0072448 A1 * | 4/2003 | Nakamura et al. ............. | 380/243 |
| 2003/0191936 A1 * | 10/2003 | Kawatsura et al. ............ | 713/156 |
| 2005/0102515 A1 * | 5/2005 | Jaworski et al. ............... | 713/168 |
| 2005/0179957 A1 * | 8/2005 | Matsuda et al. ............... | 358/400 |
| 2005/0216492 A1 * | 9/2005 | Singhal et al. ................. | 707/100 |
| 2007/0079121 A1 * | 4/2007 | Sekiguchi et al. ............. | 713/168 |
| 2007/0130298 A1 * | 6/2007 | Matsuhara et al. ............ | 709/221 |
| 2007/0179899 A1 * | 8/2007 | Hase et al. ...................... | 705/59 |
| 2007/0229876 A1 * | 10/2007 | Takashima .................... | 358/1.14 |
| 2007/0299845 A1 * | 12/2007 | Tokunaga ......................... | 707/9 |
| 2008/0002221 A1 * | 1/2008 | Fujikura et al. ............... | 358/1.15 |
| 2008/0120242 A1 * | 5/2008 | Krig et al. ....................... | 705/59 |
| 2008/0225337 A1 * | 9/2008 | Yano ............................. | 358/1.16 |
| 2008/0244057 A1 * | 10/2008 | Kojima .......................... | 709/223 |
| 2009/0020600 A1 * | 1/2009 | Akiba ............................ | 235/375 |

FOREIGN PATENT DOCUMENTS

JP 2005-135294 A 5/2005

OTHER PUBLICATIONS

"Method and System for Delivering Program for Sale, Method and Program for Installing Programs", Japan machine language translation in English for JP 2005-135294, published May 26, 2005.*
"How-To Understand Faxes", Jul. 22, 2001, How-To.com, all pages, http://web.archive.org/web/20010722113146/http://www.how-to.com/Operations/How_to_understand_faxes.htm.*

* cited by examiner

*Primary Examiner* — Calvin Cheung
(74) *Attorney, Agent, or Firm* — Rossi, Kimms & McDowell LLP

(57) ABSTRACT

A data communication apparatus that permits the use of a communication function in an appropriate manner even before a license for the communication function is made valid. A CPU of a printing apparatus as the data communication apparatus determines whether or not a trial transmission license is valid. If it is determined that the license is not valid, the CPU performs inhibits execution of processing associated with the transmission function, and restricts processing to be performed on data received using the reception function without inhibiting execution of processing associated with the reception function.

11 Claims, 15 Drawing Sheets

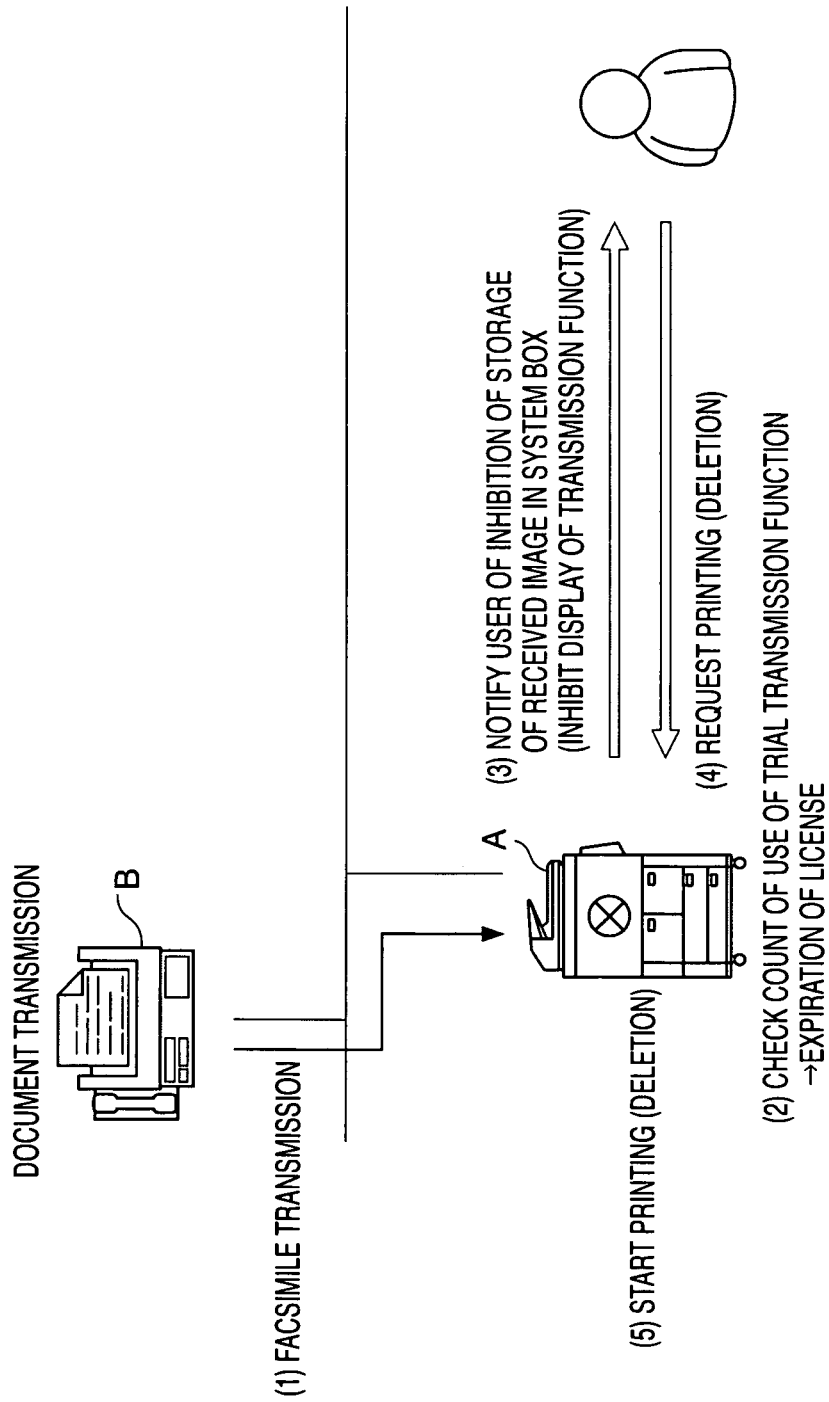

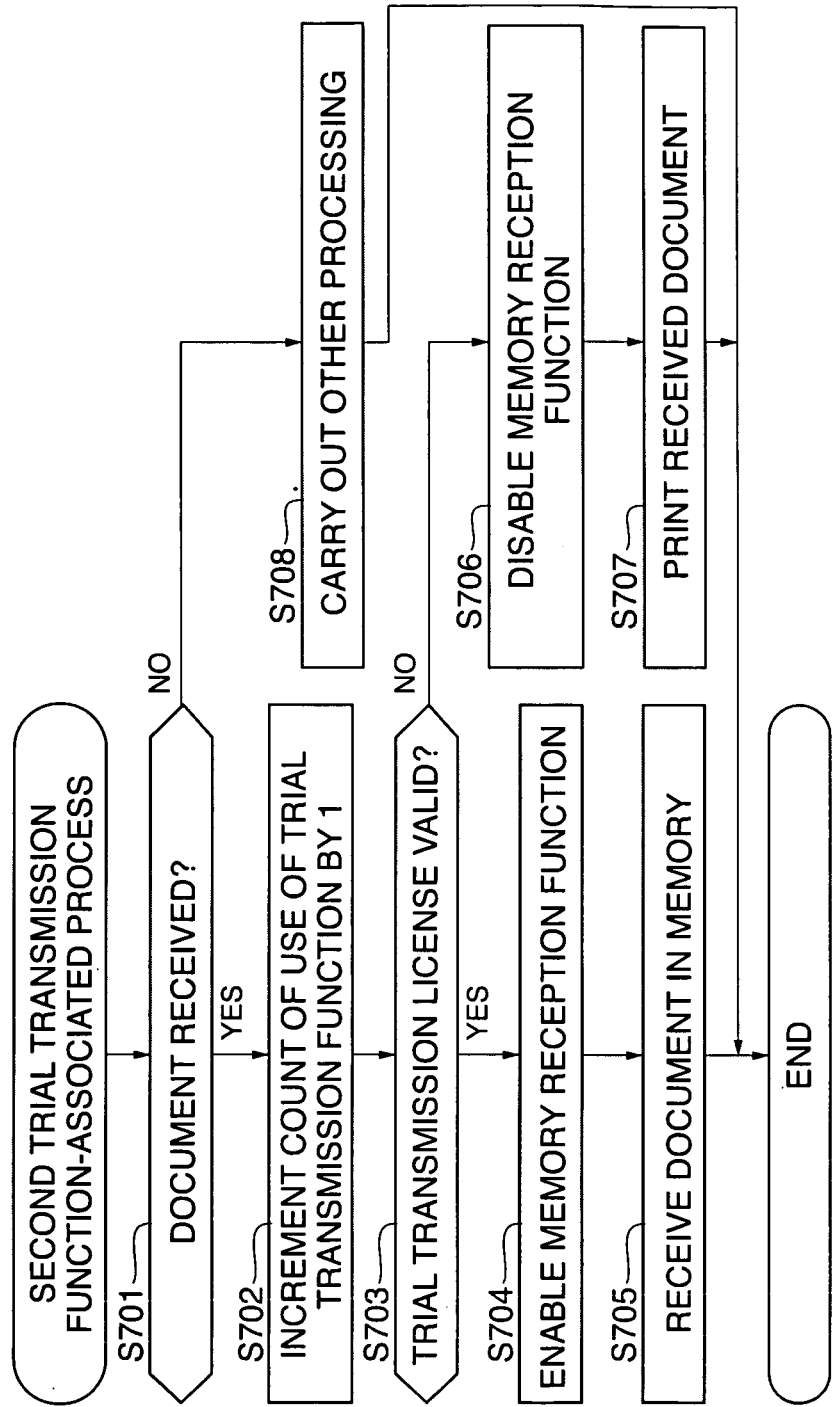

FIG. 8

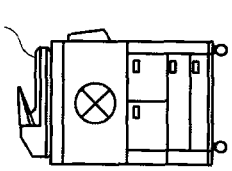
DOCUMENT TRANSMISSION
B (1) FACSIMILE TRANSMISSION

A (3) NOTIFY USER OF INHIBITION OF ADDITIONAL STORAGE OF RECEIVED IMAGE IN SYSTEM BOX (INHIBIT DISPLAY OF TRANSMISSION FUNCTION)

(4) OUTPUT WARNING REPORT

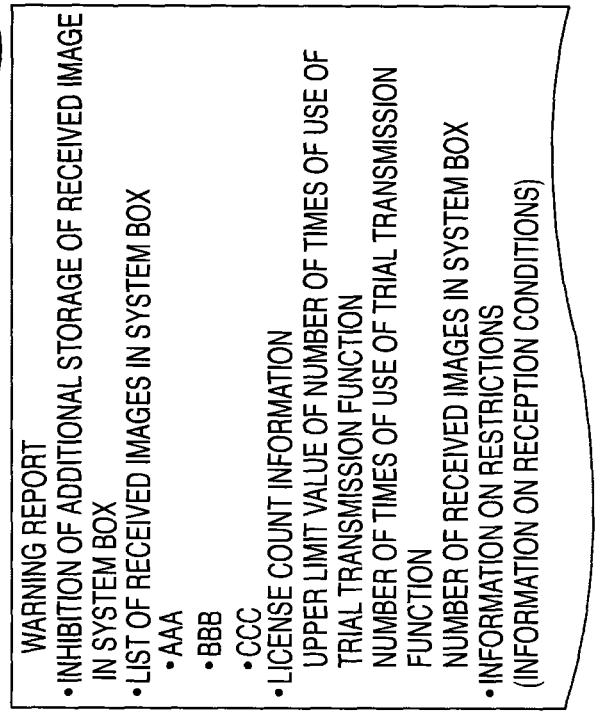

- WARNING REPORT
- INHIBITION OF ADDITIONAL STORAGE OF RECEIVED IMAGE IN SYSTEM BOX
- LIST OF RECEIVED IMAGES IN SYSTEM BOX
  - AAA
  - BBB
  - CCC
- LICENSE COUNT INFORMATION
  UPPER LIMIT VALUE OF NUMBER OF TIMES OF USE OF TRIAL TRANSMISSION FUNCTION
  NUMBER OF TIMES OF USE OF TRIAL TRANSMISSION FUNCTION
  NUMBER OF RECEIVED IMAGES IN SYSTEM BOX
- INFORMATION ON RESTRICTIONS
  (INFORMATION ON RECEPTION CONDITIONS)

(2) NUMBER OF TIMES OF USE OF TRIAL TRANSMISSION FUNCTION
+
NUMBER OF RECEIVED IMAGES IN SYSTEM BOX

⇩ CALCULATE

UPPER LIMIT VALUE OF NUMBER OF TIMES OF USE OF TRIAL TRANSMISSION FUNCTION

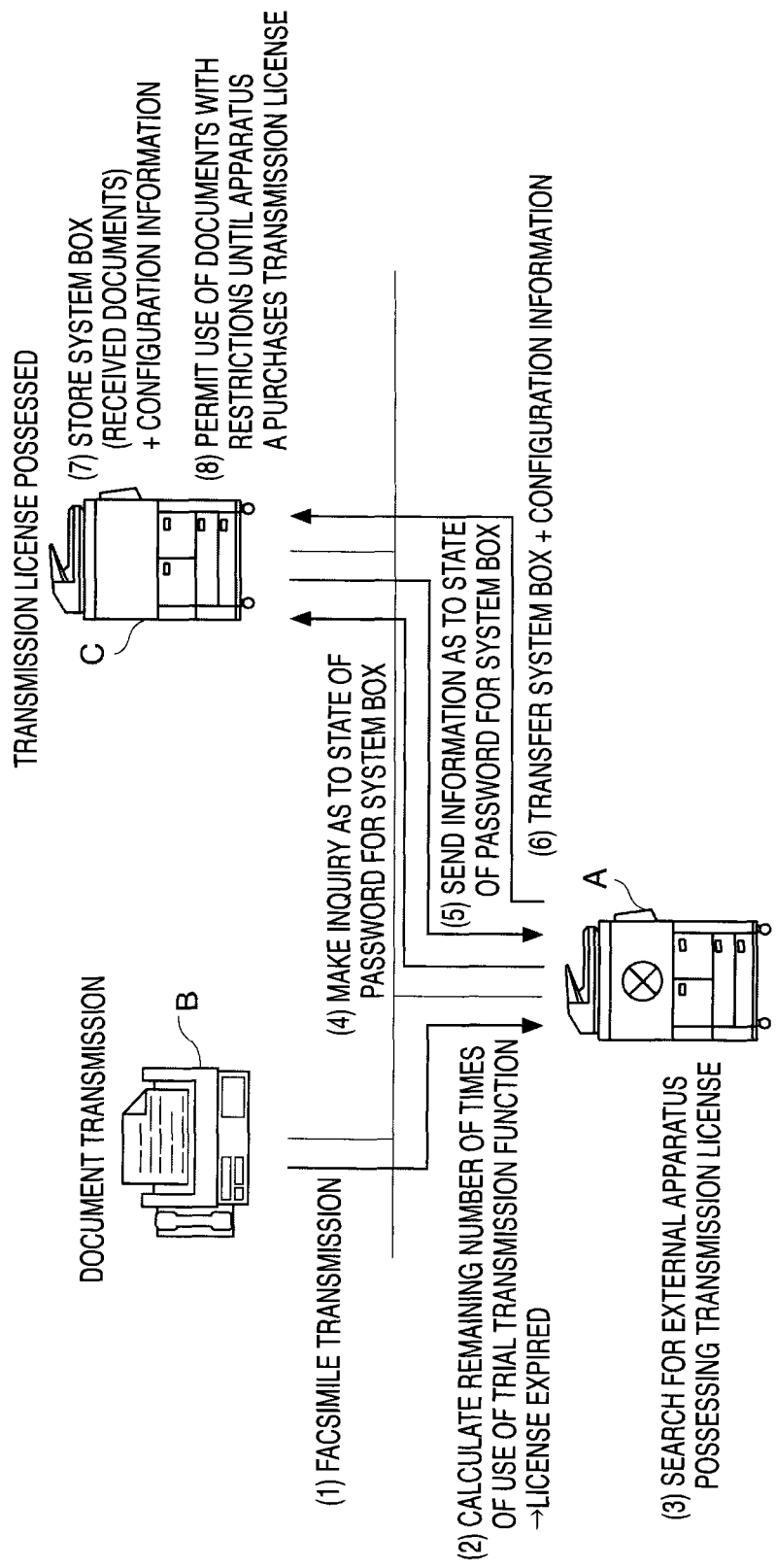

DATA COMMUNICATION APPARATUS, METHOD OF CONTROLLING THE SAME, PROGRAM, AND STORAGE MEDIUM

BACKGROUND OF THE INVENTION

1. Field of the Invention

The present invention relates to a data communication apparatus which permits the use of a specific function when a license is valid, a method of controlling the same, a program for implementing the method, and a storage medium storing the program.

2. Description of the Related Art

Conventionally, it has been known that the use of software or a specific function of an apparatus is permitted by licensing (see e.g. Japanese Patent Laid-Open Publication No. 2005-135294). Further, there has been proposed an MFP (Multi-Function Peripheral) provided with a communication function, including a function of communication by facsimile or e-mail. Furthermore, sales activities for promotion of sale of a transmission function have been conducted by causing the MFP to incorporate a "trial transmission function" which permits the trial use of the transmission function without purchasing a license until the user uses the transmission function a predetermined number of times (e.g. 100 times).

Now, it can be easily imagined that when a document or the like is transmitted using the above-mentioned transmission function, a receiving end will send a response to the transmitting end.

However, when the license for the transmission function is not valid, even if there is a response, reception of the response is refused, or even if reception of the response is permitted, handling of received data is inhibited, which can cause trouble with the responding side. More specifically, there is a fear that the responding side cannot send a document desired to be sent, or even when the desired document successfully reaches the destination, the responding side cannot check the contents of the document. On the other hand, if the use of the transmission function is permitted without restrictions before validating a license for the transmission function, there arises an inconvenience that the interest of a license managing side is impaired.

SUMMARY OF THE INVENTION

The present invention provides a data communication apparatus which permits the use of a communication function in an appropriate manner even before a license for the communication function is made valid, a method of controlling the same, a program for implementing the method, and a storage medium storing the program.

In a first aspect of the present invention, there is provided a data communication apparatus that permits both use of a transmission function and use of a reception function when a license is valid, comprising a determination unit configured to determine whether or not the license is valid, and a control unit configured to be operable when the determination unit determines that the license is not valid, to inhibit execution of processing associated with the transmission function, and restrict processing to be performed on data received using the reception function without inhibiting execution of processing associated with the reception function.

In a second aspect of the present invention, there is provided a method of controlling a data communication apparatus that permits both use of a transmission function and use of a reception function when a license is valid, comprising determining whether or not the license is valid, and controlling to inhibit execution of processing associated with the transmission function, and restrict processing to be performed on data received using the reception function without inhibiting execution of processing associated with the reception function, when it is determined that the license is not valid.

In a third aspect of the present invention, there is provided a program for causing a computer to execute a method of controlling a data communication apparatus that permits both use of a transmission function and use of a reception function when a license is valid, wherein the method comprises determining whether or not the license is valid, and controlling to inhibit execution of processing associated with the transmission function, and restrict processing to be performed on data received using the reception function without inhibiting execution of processing associated with the reception function, when it is determined that the license is not valid.

In a fourth aspect of the present invention, there is provided a computer-readable storage medium storing a program for causing a computer to execute a method of controlling a data communication apparatus that permits both use of a transmission function and use of a reception function when a license is valid, wherein the method comprises determining whether or not the license is valid, and controlling to inhibit execution of processing associated with the transmission function, and restrict processing to be performed on data received using the reception function without inhibiting execution of processing associated with the reception function, when it is determined that the license is not valid.

According to the present invention, it is possible to use the communication function in an appropriate manner even before the license for the communication function is made valid.

The features and advantages of the invention will become more apparent from the following detailed description taken in conjunction with the accompanying drawings.

BRIEF DESCRIPTION OF THE DRAWINGS

FIG. 6 is a schematic diagram useful in explaining a second trial transmission function-associated process executed in the system including the printing apparatus in FIG. 1.

FIG. 7 is a flowchart of the second trial transmission function-associated process.

FIG. 8 is a schematic diagram useful in explaining a third trial transmission function-associated process executed in the system including the printing apparatus in FIG. 1.

FIG. 10 is a schematic diagram useful in explaining fourth and fifth trial transmission function-associated processes executed in the system including the printing apparatus in FIG. 1.

DETAILED DESCRIPTION OF THE EMBODIMENTS

The present invention will now be described in detail below with reference to the accompanying drawings showing an embodiment thereof.

Figure 1:
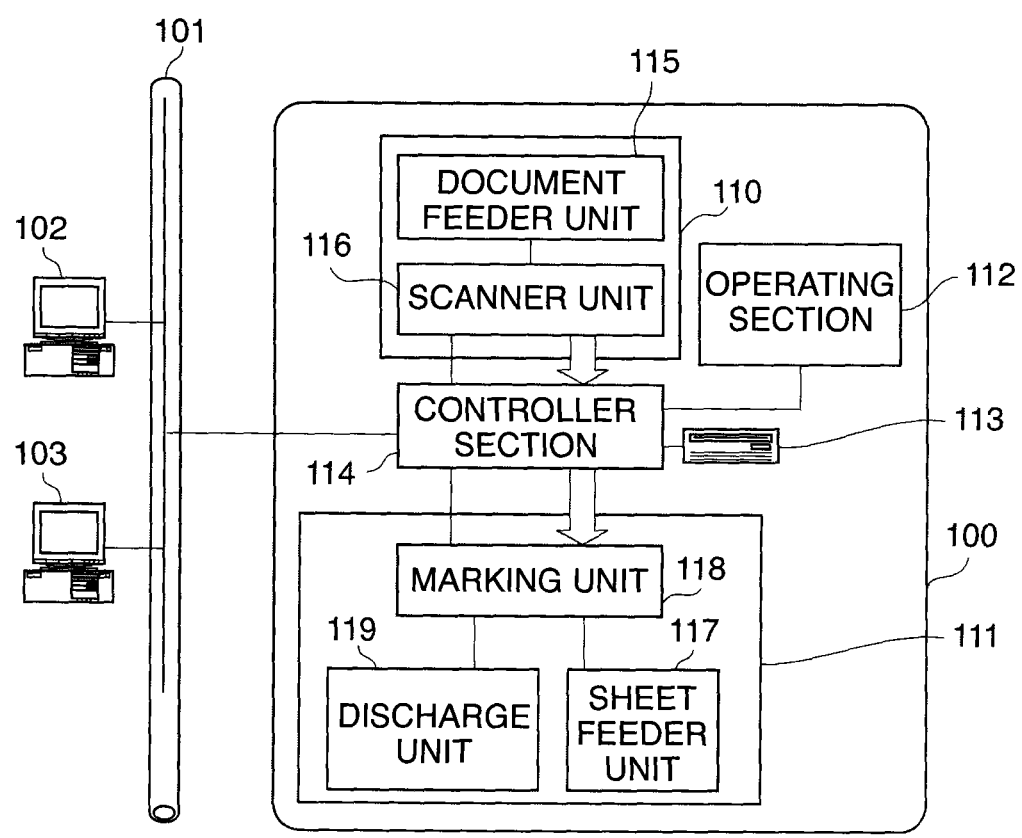
FIG. 1 is a block diagram of a printing apparatus as a data communication apparatus according to an embodiment of the present invention.

FIG. 1 a block diagram of a printing apparatus as a data communication apparatus according to the embodiment of the present invention.

The printing apparatus as the data communication apparatus according to the present embodiment is connected to a network, and is capable of exchanging data with external apparatuses. When a transmission license is valid, the printing apparatus is permitted to use a transmission function for transmitting data including documents and images stored in a storage medium (system box) to external apparatuses connected to the network. It should be noted that although in the following, a description will be given by taking as an example the printing apparatus having an image printing function, it suffices that the data communication apparatus according to the present embodiment has a license-managed data communication function, and hence the printing function is not indispensable.

Referring to FIG. 1, the printing apparatus (image input/output apparatus) 100 is connected to host computers 102 and 103 by a LAN (Local Area Network) 101 implemented e.g. by Ethernet (registered trademark). This connection may be established via a network other than the LAN.

The printing apparatus 100 is comprised of a reader unit 110 that reads an image from an original and generates image data representative of the image, a printer unit 111 that performs image printing based on image data, and an operating section 112 provided with a liquid crystal panel for accepting operator operations, and performing display of image data and various functions, and so forth.

Further, the printing apparatus 100 includes a hard disk drive (HDD) 113 that stores control programs, image data, etc. written therein. The HDD 113 also stores a license management file indicating whether or not respective licenses for functions are valid. The printing apparatus 100 further includes a controller section 114 connected to the components, for controlling each of the components.

The reader unit 110 is comprised of a document feeder unit 115 that conveys sheet originals, and a scanner unit 116 that optically reading an image from each sheet original and converting the image into image data as an electric signal. The image data obtained in the reader unit 110 by reading the image from the original can be output to the printer unit 111 and printed thereby, or can be sent to an external apparatus via the LAN 101 or a telephone line. Transmission via the LAN 101 is performed using the e-mail protocol, the FTP or the like, while transmission via the telephone line is performed using the facsimile protocol.

The printer unit 111 includes a sheet feeder unit 117 having a plurality of sheet cassettes containing recording sheets, and a marking unit 118 for transferring developer onto a recording sheet based on image data and fixing the developer on the recording sheet. Further, the printer unit 111 is provided with a discharge unit 119 for carrying out sorting processing and stapling processing on recording sheets each having an image printed thereon and then discharging the recording sheets from the apparatus. The printer unit 111 is capable of printing an image based on image data delivered from the reader unit 110 or image data received via the LAN 101 or the telephone line. Reception of print data from a printer driver installed in a host computer on the LAN 101 and reception of an e-mail using the e-mail protocol are performed via the LAN 101. Reception via the telephone line is performed using the facsimile protocol.

It should be noted that the function of communicating image data via the LAN 101, using the e-mail protocol or the FTP, will be referred to as the network communication function, and the function of communicating image data via the telephone line, using the facsimile protocol, will be referred to as the facsimile communication function. The printing apparatus 100 manages permission of the use of the network communication function and the facsimile communication function, based on whether or not an associated license is valid. The license may be managed such that the network communication function and the facsimile communication function are distinguished from each other, or may be managed without such distinction. In a case where the license is managed without distinction between the network communication function and the facsimile communication function, when the license is not valid, the use of the network communication function and the use of the facsimile communication function are simultaneously restricted.

Figure 2:
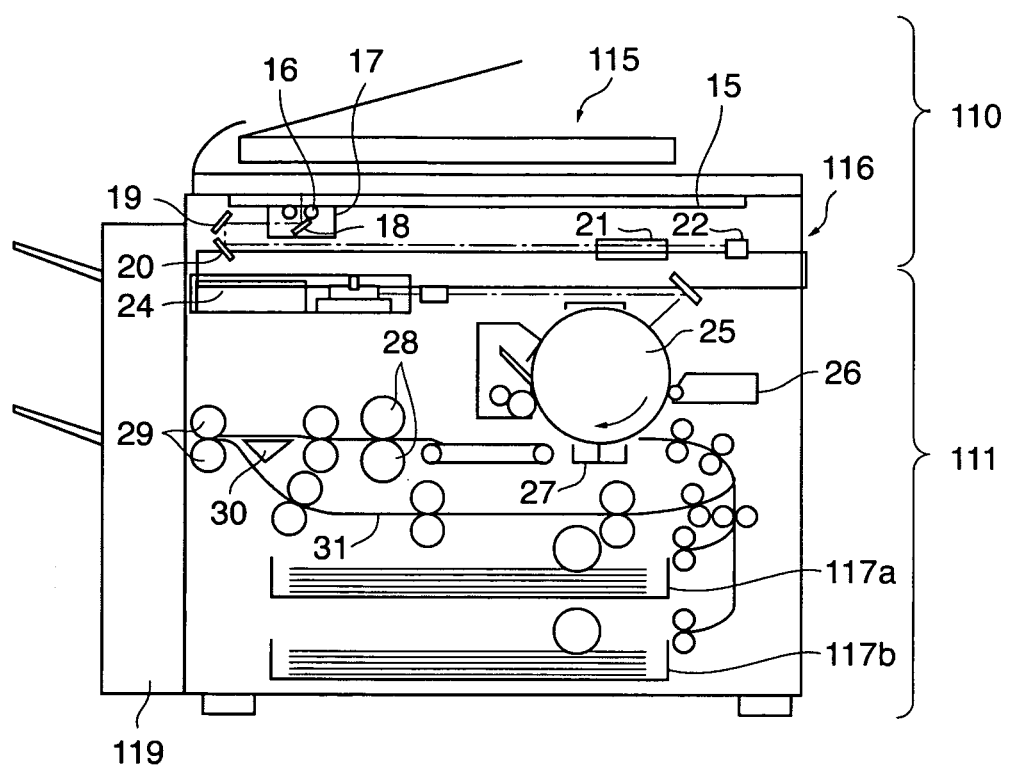
FIG. 2 is a diagram showing the internal construction of the printing apparatus in FIG. 1.

FIG. 2 is a view showing the internal construction of the printing apparatus 100 in FIG. 1.

In the reader unit 110, sheet originals stacked in the document feeder unit 115 are sequentially fed onto a platen glass 15 one by one from the uppermost one in the order in which the sheet originals are stacked from top to bottom in a selected cassette.

After completion of a predetermined reading operation by the scanner unit 116, the scanned original is discharged from the platen glass 15 into the document feeder unit 115. In the scanner unit 116, when an original is conveyed onto the platen glass 15, a lamp 16 is turned on, and then an optical unit 17 is moved to a reading position and fixedly stopped there. The optical unit 17 illuminates the conveyed original from below and then scan the same. Reflected light from the original is guided to a CCD image sensor (hereinafter simply referred to as "the CCD") 22 via a plurality of mirrors 18 to 20 and a lens 21, whereby an image on the scanned original is read by the CCD 22. Then, the image data read by the CCD 22 is subjected to predetermined processing, followed by being delivered to the controller section 114 (not shown in FIG. 2).

In a case where the document feeder unit 115 is not used, in response to a reading instruction from the operating section 112, the lamp 16 is turned on in the same manner, and then the optical unit 17 is moved to the reading position, and is caused to scan an original placed on the platen glass 15 by an operator and illuminated from below. Thus, an image on the scanned original can be read by the CCD 22.

Then, in the printer unit 111, a laser beam corresponding to the image data output from the controller section 114 is emitted from a laser emitter 24 driven by a laser driver. An electrostatic latent image corresponding to the laser beam is formed on a photosensitive drum 25 of the marking unit 118, and developer is deposited on the electrostatic latent image on the photosensitive drum 25 by a developing device 26.

On the other hand, a recording sheet is fed from the sheet feeder unit 117 (117a or 117b) in timing synchronous with starting of the emission of the laser beam, and is conveyed to a transfer section 27, and the developer deposited on the photosensitive drum 25 is transferred onto the recording sheet. The recording sheet having the developer transferred thereon based on the image data is conveyed to a fixing section 28 to be subjected to heating and pressurizing processing there, whereby the developer transferred based on the image data is fixed on the recording sheet, to print the image.

In the case of printing an image based on image data on a single side of a recording sheet, the recording sheet having the image printed on the single side thereof by passing through the fixing section 28 is immediately discharged into the discharge unit 119 by a discharge roller pair 29.

The discharge unit 119 bundles discharged recording sheets to sort the recording sheets, and then carries out stapling processing on the sorted recording sheets.

On the other hand, in the case of printing images based on image data on both sides of a recording sheet, the recording sheet having an image printed on a single side thereof is conveyed to the discharge roller pair 29, and then the direction of rotation of the discharge roller pair 29 is reversed. Thereafter, the recording sheet is guided into a re-feeding conveying passage 31 by a flapper 30. The recording sheet guided into the re-feeding conveying passage 31 is conveyed to the transfer section 27 in the same timing as described above, whereby an image is printed on the reverse side of the recording sheet.

Figure 3:
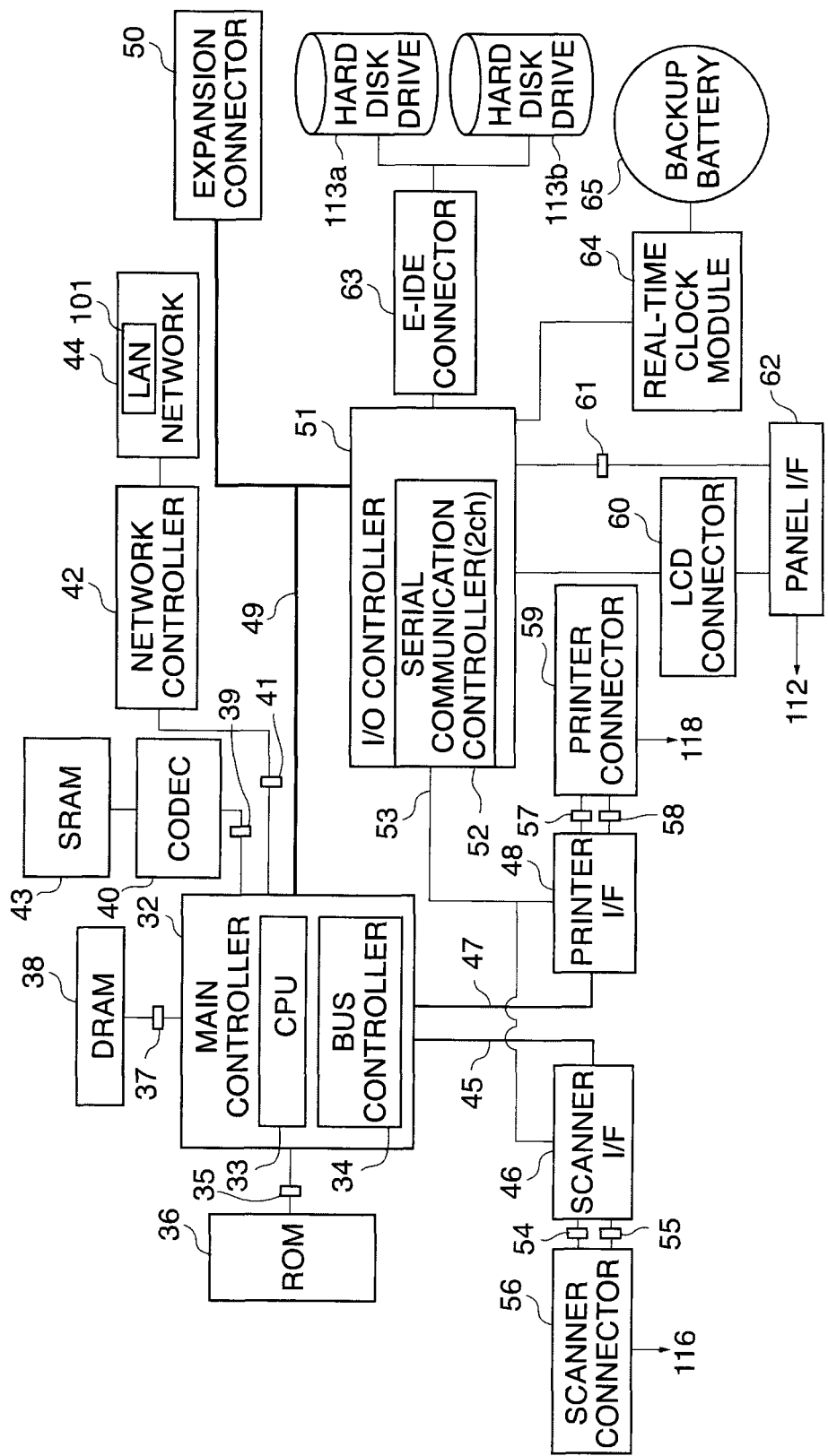
FIG. 3 is a detailed block diagram of a controller section appearing in FIG. 1.

FIG. 3 is a detailed block diagram of the controller section appearing in FIG. 1.

A main controller 32 incorporates a CPU 33, a bus controller 34, and functional blocks including various kinds of controller circuits, described hereinafter. The main controller 32 is connected to a ROM 36 via a ROM interface 35 and to a DRAM 38 via a DRAM interface 37.

Further, the main controller 32 is connected to a codec 40 via a codec interface 39 and to a network controller 42 via a network interface 41.

The ROM 36 stores various kinds of control programs to be executed by the CPU 33 of the main controller 32, and operation data. The DRAM 38 is used as a work area for operation of the CPU 33 or an area for accumulating image data.

The codec 40 compresses raster image data accumulated in the DRAM 38, using a well-known compression method, such as MH, MR, MMR, or JBIG, or expands compressed data into raster image data. An SRAM 43 is connected to the codec 40, and provides a temporary work area for the codec 40.

The network controller 42 performs a predetermined control operation for interfacing with a network 44 (including the LAN 101). The network controller 42 has a function of converting e.g. information concerning the status of the printing apparatus 100 into an HTML (HyperText Markup Language) file. The network controller 42 outputs the HTML file, using the HTTP, to an external apparatus on the network 44 to thereby enable browsing via a general-purpose Web browser. In this case, it is possible to form reduced image data (thumbnail data) from image data accumulated in the HDD 113 and link the reduced image data to the HTML file so as to enable a small-sized rough representation (a thumbnail) of the image data in the HDD 113 to be viewed for confirmation on the Web browser of the external apparatus.

Further, the main controller 32 is connected to a scanner interface 46 via a scanner bus 45 and to a printer interface 48 via a printer bus 47.

Furthermore, the main controller 32 is connected to an expansion connector 50 for connection of an expansion board, and to an input/output control section (I/O controller) 51 via a general-purpose high-speed bus 49 implemented by a PCI bus or the like.

The I/O controller 51 is provided with a 2-channel start-stop synchronization serial communication controller 52 for exchanging control commands with the reader unit 110 and the printer unit 111. The serial communication controller 52 is connected to the scanner interface 46 and the printer interface 48 via an I/O bus 53.

The scanner interface 46 is connected to a scanner connector 56 via a first start-stop synchronization serial interface 54 and a first video interface 55, and the scanner connector 56 is connected to the scanner unit 116 of the reader unit 110.

The scanner interface 46 performs desired binarization processing and main and/or sub scanning direction scaling process on image data received from the scanner unit 116 via the scanner connector 56. Further, the scanner interface 46 generates a control signal based on a video signal delivered from the scanner unit 116 via the scanner connector 56 and transfers the generated control signal to the main controller 32 via the scanner bus 45.

The printer interface 48 is connected to a printer connector 59 via a second start-stop synchronization serial interface 54 and a second video interface 58, and the printer connector 59 is connected to the marking unit 118 of the printer unit 111.

The printer interface 48 performs smoothing processing on image data output from the main controller 32 and outputs the processed image data to the marking unit 118. Further, the printer interface 48 outputs to the printer bus 47 a control signal generated based on a video signal delivered from the marking unit 118.

The CPU 33 operates based on a control program read out from the ROM 36 via the ROM interface 35 or a control program read out from the HDD 113.

The bus controller 34 controls the transfer of data input and output to and from external devices connected to the scanner interface 46, the printer interface 48, the expansion connector 50, and so forth, and performs arbitration during bus contention and control of DMA data transfer.

More specifically, for example, data transfer between the DRAM 38 and the codec 40, data transfer from the scanner unit 116 to the DRAM 38, data transfer from the DRAM 38 to the marking unit 118, and so forth are controlled by the bus controller 34, for execution of DMA transfer.

The I/O controller 51 is connected to a panel interface 62 via an LCD controller 60 and a key input interface 61, and the panel interface 62 is connected to the operating section 112. Further, the I/O controller 51 is connected to the HDD 113 (113a, 113b) via an E-IDE connector 63, and to a real-time clock module 64 provided to update and store the date and time managed in the apparatus.

The real-time clock module 64 is connected to a backup battery 65 and backed up by the same.

Figure 4:
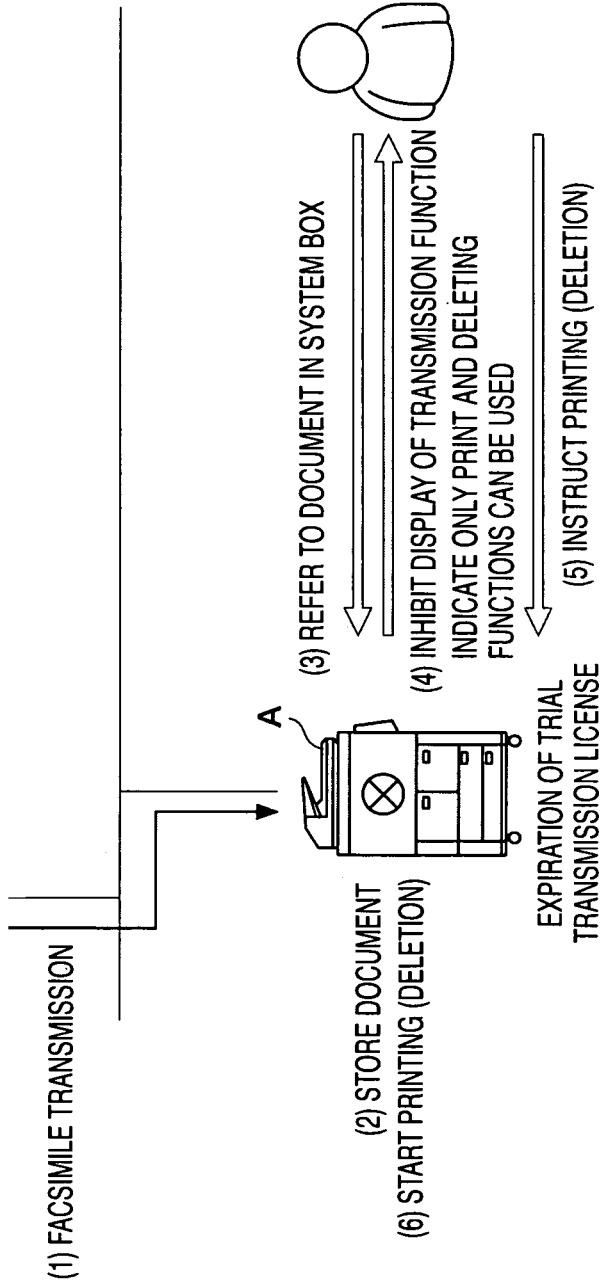
FIG. 4 is a schematic diagram useful in explaining a first trial transmission function-associated process executed in a system including the printing apparatus in FIG. 1.

FIG. 4 is a schematic diagram useful in explaining a first trial transmission function-associated process executed when a trial transmission license issued to the printing apparatus 100 has expired, so as to restrict processing associated with the reception function of the network communication function and the facsimile communication function.

Referring to FIG. 4, image data (document) is transmitted from a document transmitting apparatus (facsimile machine) B to an apparatus A (printing apparatus 100) according to the facsimile protocol (1). The apparatus A stores the received document in a system box (2). It is assumed that if the CPU 33 determines at this time that the trial transmission license has expired, the received document is saved in the system box without being automatically printed. It should be noted that the system box is an area provided in the HDD 113 so as to store documents received by facsimile.

When a user attempts to refer to a document stored in the system box in the apparatus A (3), if the trial transmission license has expired, a selection button for selecting the transmission function for transferring a document from the system box to an external apparatus is inhibited from being displayed on the operating section 112, whereby transfer of the document to the external apparatus is inhibited (4). At this time, a message may be displayed to show that the selection button cannot be used due to expiration of the trial transmission license.

On the other hand, issuing of a print instruction for printing a document selected from a document list stored in the system box is permitted (5). In this case, the user does not always have to issue the print instruction, but may only choose to refer to the document list or to delete the selected document. Upon reception of the instruction for printing (or deletion), the apparatus A prints (or deletes) the selected document (6). The above-described operations may be carried out not via the operating section 112, but via a Web browser of an external apparatus on the network, based on an HTML file generated by the network controller 42.

As described above, if the trial transmission license has expired (i.e. the license is not valid), facsimile reception is not inhibited and hence reception of image data is permitted. However, transfer of the received image data to an external apparatus is inhibited, and only the printing apparatus 100 (apparatus A) having received the image data is permitted to print the received image data. Further, if the trial transmission license is not valid, not only transmission of image data stored in the system box, but also transmission of image data obtained by reading an original by the reader unit 110 is inhibited.

Figure 5A:
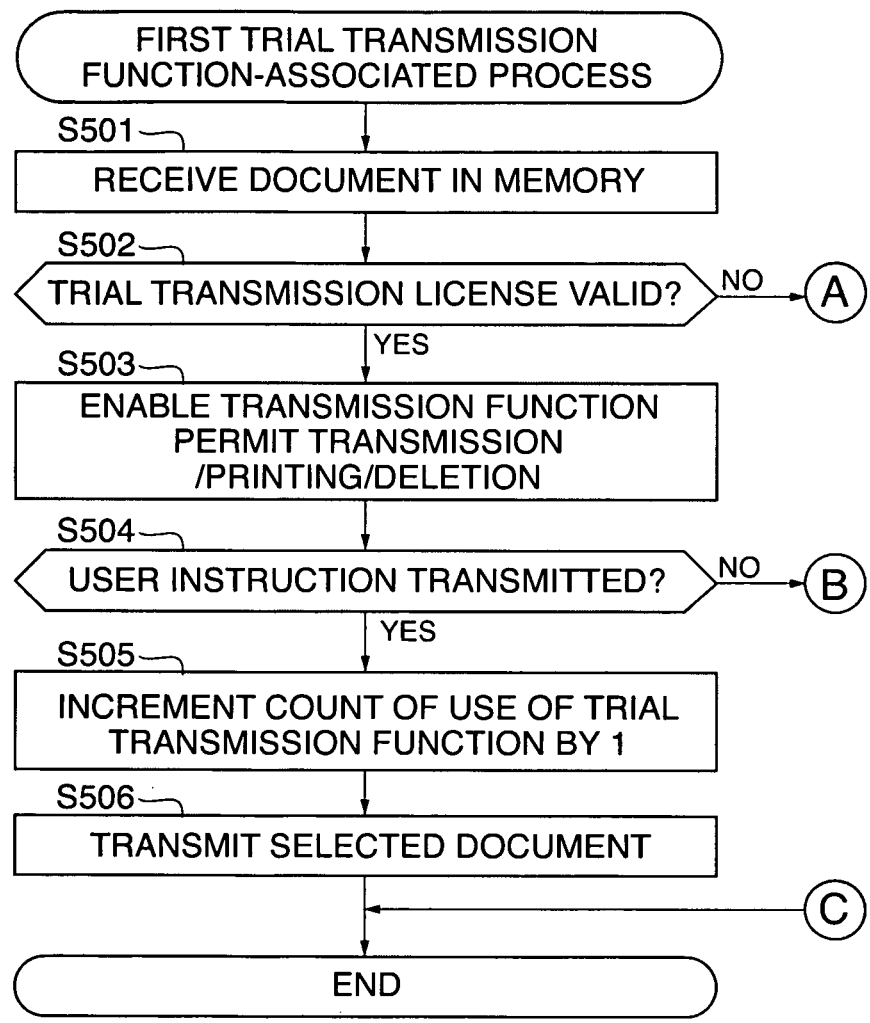
FIGS. 5A and 5B are flowcharts of the first trial transmission function-associated process.
Figure 5B:
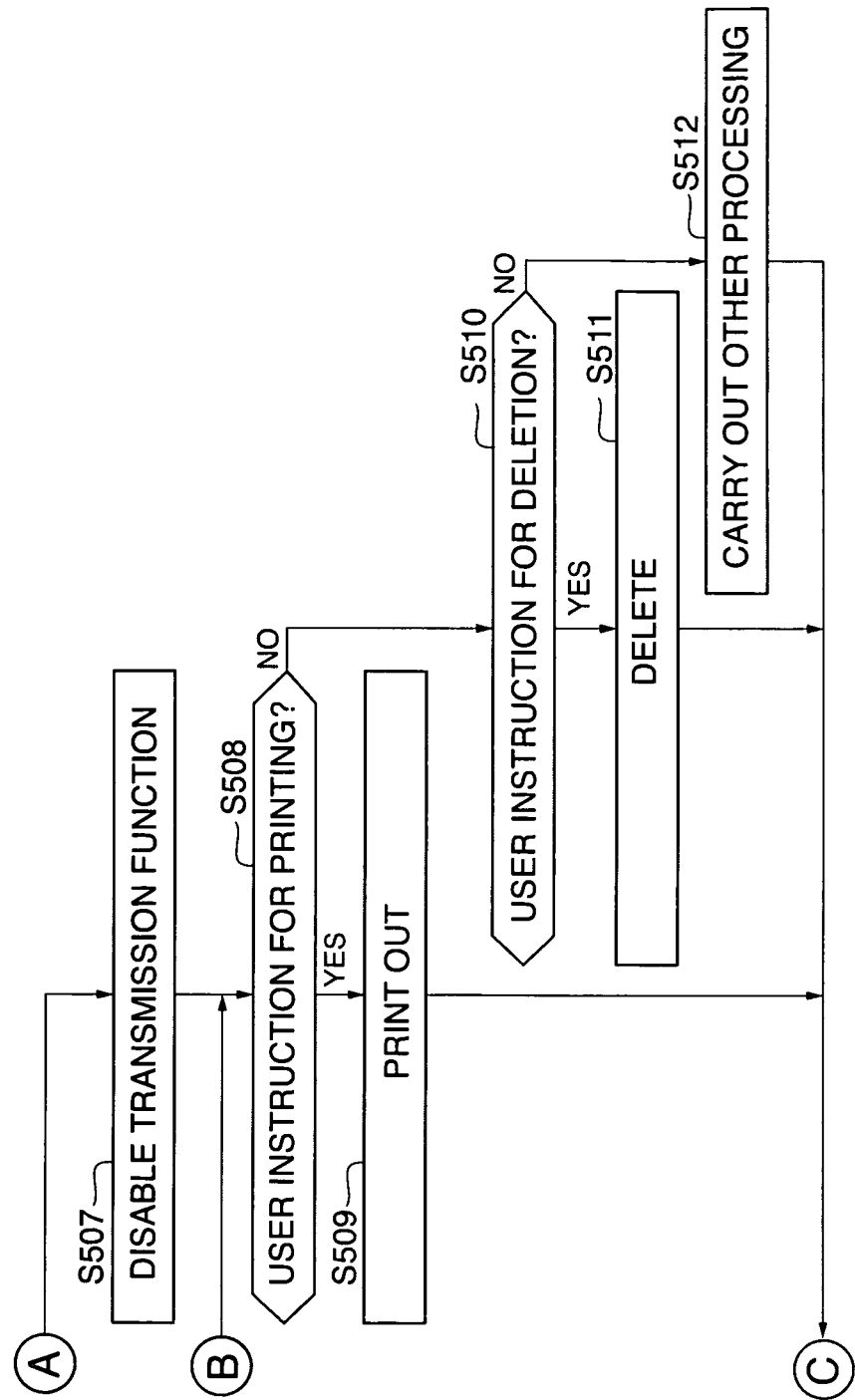

FIGS. 5A and 5B are flowcharts of the first trial transmission function-associated process, described with reference to FIG. 4, which is executed by the printing apparatus 100. This process is executed by the CPU 33 of the printing apparatus 100 reading out a control program stored in the HDD 113 and executing the same.

First, when image data (document) is transmitted from the document transmitting apparatus (facsimile machine B), the printing apparatus 100 receives the document to store the same in a memory (performs memory reception) in a step S501. In a step S502, it is determined whether or not the trial transmission function can be used any more times (i.e. whether or not the trial transmission license is still valid). This determination is made by determining whether or not the trial transmission license has been issued and comparing the count of the number of times of use of the license with a predetermined upper limit value. First, it is determined whether or not the count of the number of times of use of the license has exceeded the predetermined upper limit value (e.g. 100 times). If the count of the number of times of use has exceeded the upper limit value, it is determined that the license is not valid. If it is determined that the count of the number of times of use has not exceeded the upper limit value and hence the license is still valid, i.e. if the transmission function is permitted to be used, the document list stored in the system box is displayed on the operating section 112 in a step S503 so as to enable the user to select one of transmission, printing, and deletion of a document selected from the system box. Also in a case where the printing apparatus 100 is operated using the Web browser of an external apparatus on the network, the display of the same screen as the operation screen displayed on the operating section 112 on the Web browser is permitted.

When the user gives an instruction for processing the document in the system box, via the operating section 112 or the Web browser, it is determined in a step S504 whether or not the instruction is for transmission. If it is determined that the instruction from the user is for transmission, the number of times of use of the trial transmission license is incremented by 1 in a step S505. Then, in a step S506, the document selected by the user in the step S503 is transmitted to a designated destination in response to the instruction, followed by terminating the present process. In the present example, the number of times of use is incremented only upon transmission. It should be noted that in the step S506, if the designated transmission is facsimile transmission, the number of times of use of the facsimile communication function is incremented, while if the designated transmission is network transmission, the number of times of use of the network communication function is incremented. Of course, the number of times of use may be incremented without distinction between the network communication function and the facsimile communication function.

If it is determined in the step S504 that the instruction from the user is not for transmission, it is determined in a step S508 whether or not the instruction is for printing. If it is determined that the instruction from the user is for printing, the document selected by the user in the step S503 is printed by the printer unit 111 in a step S509, followed by terminating the present process.

If it is determined in the step S508 that the instruction from the user is not for printing, it is determined in a step S510 whether or not the instruction from the user is for deletion. If it is determined that the instruction from the user is for deletion, the document selected by the user in the step S503 is deleted from the HDD 133 in a step S511, followed by terminating the present process.

If it is determined in the step S510 that the instruction from the user is not for deletion, other processing is carried out in a step S512, followed by terminating the present process.

On the other hand, if it is determined in the step S502 that the number of times of use of the trial transmission license has exceeded the upper limit value, i.e. if the license is not valid, the process proceeds to a step S507, wherein a screen indicating inhibition of use of the transmission function e.g. by making invisible the transmission button for use in executing a document transmission operation is displayed on the operating section 112. Then, the process proceeds to the step S508, and the steps S508 et seq. are carried out following the above-described procedure.

By executing the above-described process, when the trial transmission license is not valid, it is possible to inhibit the use of the transmission function while permitting the reception function, and to limit processing of a received document to printing by the printing apparatus 100 and browsing via a Web browser.

Next, a second trial transmission function-associated process for inhibiting memory reception will be described with reference to FIG. 6. This process is executed as a method of restricting processing associated with the reception function of the network communication function and the facsimile communication function.

FIG. 6 is a schematic diagram useful in explaining the second trial transmission function-associated process.

Similarly to the FIG. 4 example, in a FIG. 6 example as well, image data (document) is transmitted from the document transmitting apparatus B to the apparatus A (printing apparatus 100) according to the facsimile protocol (1). The apparatus A checks the count of the number of times of use of the trial transmission function, and determines that the trial transmission license has expired (i.e. it is not valid) (2). When the license has expired, the memory reception for storing received image data in the system box is inhibited, which is displayed on the operating section 112 as a notification to the user. When printing cannot be carried out at this time e.g. due to running out of sheets in the sheet cassettes, only temporary storage of the image data in the DRAM 39 is permitted.

Transfer of the image data from the DRAM 39 to the system box is inhibited by controlling the operating section 112 not to display an operation button for the transfer. Processing of the document temporarily stored in the DRAM 39 can only be selected between printing thereof by the printer unit 111 and deletion thereof (3).

When there is a document temporarily stored in the DRAM 39 due to running out of recording sheets, the fact is displayed on the operating section 112, so that the user can give a print instruction or a delete instruction for the document (4). If the print instruction is issued, the document is printed by the printer unit 111. If the delete instruction is issued, the document is deleted from the DRAM 39. It should be noted that when there are a sufficient number of recording sheets in the above (3), the document is automatically printed by the printer unit 111 without the print instruction from the user (6).

FIG. 7 is a flowchart of the second trial transmission function-associated process, described with reference to FIG. 6, which is executed by the printing apparatus 100. This process is executed by the CPU 33 of the printing apparatus 100 reading out a control program stored in the HDD 113 and executing the same.

First, if it is determined in a step S701 that image data (document) has been received from the document transmitting apparatus B, the process proceeds to a step S702.

In the step S702, the count of a license counter for counting the number of times of use of the license for the trial transmission function is incremented by 1. That is, in the present example, the number of times of use of the license is also incremented upon reception of each document. However, it is assumed that even after the number of times of use of the license has exceeded the upper limit value, reception is permitted. Of course, the step S702 may be omitted, and the number of times of use of the license may be incremented only when the transmission function is used.

If it is determined in a step S703 that the number of times of use of the trial transmission license has not exceeded the upper limit value after execution of the step S702, i.e. if the trial transmission license is still valid, a memory reception function (i.e. a function of accumulating received documents in the system box so as to enable the user to process the received documents as desired) is enabled in a step S704. Then, in a step S705, the document received from the document transmitting apparatus B in the step S701 is stored in the system box in the HDD 113, followed by terminating the present process. This enables the user to transfer the received document to an external apparatus via the operating section 112 or the Web browser of the external apparatus. It should be noted that the received document may be printed by the printer unit 111 in the step S705, with or without storing the same in the system box, according to settings configured in advance via the operating section 112.

If it is determined in the step S703 that the count of the number of times of use of the trial transmission license has exceeded the upper limit value, i.e. if the trial transmission license is invalid, the memory reception function for storing image data in the system box is disabled in a step S706. Then, the received document is automatically printed by the printer unit 111 in a step S707, followed by terminating the present process. It should be noted that if printing cannot be carried out at this time e.g. due to absence of sheets in the sheet cassette, the received document is temporarily stored in the DRAM 39. The document stored in the DRAM 39 is printed when the sheet cassette is replenished with recording sheets and when a print instruction is issued from the user. When a delete instruction is issued by the user, the document stored in the DRAM 39 is deleted without being printed. It should be noted that browsing of the document stored in the DRAM 39 via the Web browser of an external apparatus is assumed to be inhibited.

If it is determined in the step S701 that no document has been received, the process proceeds to a step S708, wherein other processing is carried out, followed by terminating the present process.

By executing the above-described process, when the trial transmission license is not valid, it is possible to disable the transmission function while permitting the reception function, and to limit processing of a received document to printing by the printing apparatus 100.

Next, a third trial transmission function-associated process for printing out a report warning of expiration of the license will be described with reference to FIG. 8. It should be noted that this third trial transmission function-associated process is a process executed to notify the user of expiration of the license, but not a process executed to restrict processing associated with the reception function. Therefore, it is possible to combine this FIG. 8 third trial transmission function-associated process with the first trial transmission function-associated process in FIG. 4 or the second trial transmission function-associated process in FIG. 6, as deemed appropriate, as described hereinafter.

FIG. 8 is a schematic diagram useful in explaining the third trial transmission function-associated process for printing out the warning report for warning of expiration of the license.

First, image data (document) is transmitted from the document transmitting apparatus B to the apparatus A (printing apparatus 100) according to the facsimile protocol (1). In this process, the count of the number of times of use of the license is also incremented upon reception of each document. It is determined by the apparatus A whether or not the count of the number of times of use of the license exceeds the upper limit value thereof, and determines, when the count exceeds the upper limit value, that the trial transmission license has expired due to the present reception (2). Then, the number of received documents in the system box is checked. This check is performed so as to notify the user of the number before the user is inhibited from handling a document in the system box after expiration of the license. It should be noted that it is also possible to envisage a manner of management of the trial transmission license in which the number of times of use of the license is incremented each time a received document in the system box is printed or transferred. Therefore, determination as to expiration of the license may be made based on whether or not the total of the present count of the number of times of use of the license and the number of received documents (including a document received this time) in the system box exceeds the upper limit value of the number of times the license can be used.

When the count of the number of times of use of the license exceeds the upper limit value, the user is notified, via the operating section 112 or the Web browser of an external apparatus, that reception of a document for storage in the system box will be inhibited from this time on (3). Subsequently, a warning report describing the use status and the like information on the trial transmission license is output from the printer unit 111 (4). The warning report contains not only the warning that additional storage of a received document in the system box will be inhibited from this time on, but also a list of documents stored so far in the system box. This enables the user to easily know that the license has expired. Further, the warning report may be configured to contain the upper limit value of the number of times the trial transmission license can be used, the present count of the number of times of use of the license, and the number of received documents stored in the system box. This helps the user to understand what licenses should be further obtained. Further, restrictions imposed when the license is not valid may be described. This helps the user to determine whether or not the transmission license should be obtained. Furthermore, this warning report may be sent to a predetermined destination by e-mail or the like in addition to being printed out. After the warning report is output, or after a predetermined time period has elapsed after output of the warning report, printing of a received document, which is permitted in the processes described hereinbefore, may be inhibited after printing having been carried out a predetermined number of times.

Figure 9:
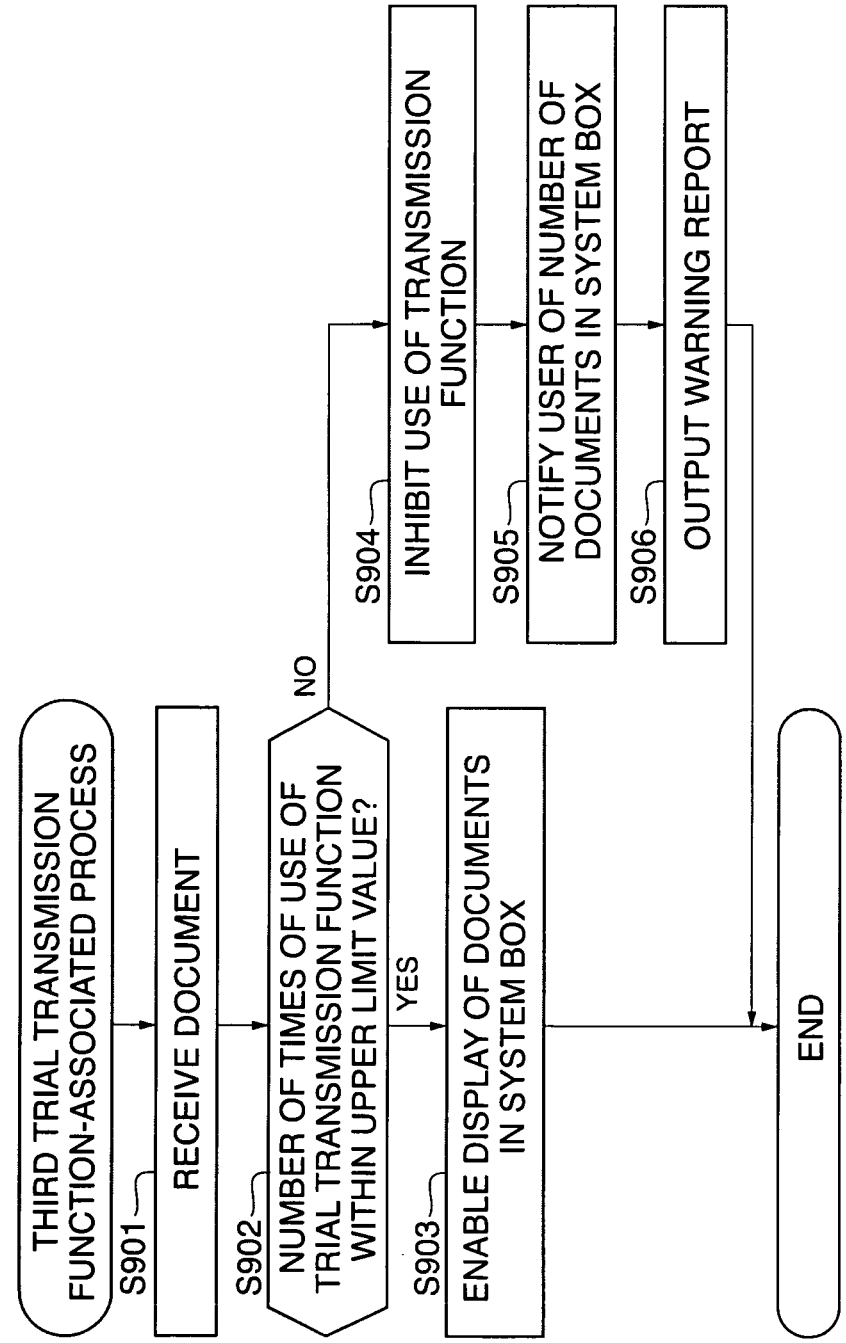
FIG. 9 is a flowchart of the third trial transmission function-associated process.

FIG. 9 is a flowchart of the third trial transmission function-associated process, described with reference to FIG. 8, which is executed by the printing apparatus 100. This process is executed by the CPU 33 of the printing apparatus 100 reading out a control program stored in the HDD 113 and executing the same.

First, a document is received in a step S901, followed by the process proceeding to a step S902. In the step S901, if it is configured that the number of times of use of the license is incremented each time a document is received, the count is incremented.

In the step S902, it is determined whether or not the count of the number of times of use of the trial transmission license is within the upper limit value. In a case where it is configured that the number of times of use of the license is incremented each time a document is received (Setting 1), it is determined whether or not the count incremented upon this document reception is within the upper limit value. On the other hand, in a case where it is configured that the number of times of use of the license is counted whenever a received document in the system box is printed or transferred (Setting 2), it is determined whether or not the total of the present count of the number of times of use of the license and the number of received documents (including the document received this time) in the system box is within the upper limit value.

If it is determined that the count of the number of times of use of the trial transmission license is within the upper limit value, i.e. if the trial transmission license is still valid, the process proceeds to a step S903, wherein the document in the system box is allowed to be displayed on the operating section 112 or on the Web browser of an external apparatus so as to permit the user to handle the document, followed by terminating the present process.

If it is determined in the step S902 that the count of the number of times of use of the trial transmission license has exceeded the upper limit value, i.e. if the trial transmission license has expired, the process proceeds to a step S904, wherein the use of the transmission function, including transmission of a document stored in the system box, is inhibited (in the case of Setting 1). In the case of Setting 2, document transmission is inhibited except transmission of documents stored in the system box. It should be noted that in the case of Setting 2, document transmission is permitted only once per document. Printing may be performed in place of transmission.

Then, in a step S905, the user is notified, via the operating section 112 or the Web browser of the external apparatus, of expiration of the trial transmission license and the number of documents remaining in the system box. Then, in a step S906, the warning report is printed out by the printer unit 111 to notify the user of expiration of the trial transmission license, followed by terminating the present process. The warning report may be not only printed out by the printer unit 111, but also sent to a predetermined address (e.g. an administrator) by e-mail.

In Setting 2, by securing the remaining number of times the trial transmission function can be used such that it corresponds to the number of documents remaining in the system box, the use of the transmission function for transmission of the documents in the system box is guaranteed. Further, by inhibiting any more documents from being received in the system box, it is possible to prevent documents that cannot be transmitted from being stored in the system box.

Furthermore, by using the warning report to provide the user with detailed information about expiration of the license, it is possible to recommend the user to purchase a transmission license.

Next, a description will be given of a case where when the trial transmission license has expired, the system box and configuration information (including a password) associated therewith are transferred as a set to an external apparatus connected to the network and having the transmission license. In this example, it is assumed that received documents can be saved in an external apparatus or processed with restrictions in an apparatus as a transfer destination, until a normal transmission license is purchased. This restricts processing related to the reception function, when the trial transmission license is not valid.

FIG. 10 is a schematic diagram useful in explaining a fourth trial transmission function-associated process executed in the above-mentioned case.

It is assumed that the apparatus A (printing apparatus 100) provided with the trial transmission function, the document transmitting apparatus B, and an apparatus C (having the same construction as the printing apparatus 100) possessing the normal transmission license are interconnected via the network as shown in FIG. 10.

First, image data (document) is transmitted from the document transmitting apparatus B to the apparatus A according to the facsimile protocol (1). Then, the apparatus A checks the count of the number of times of use of the trial transmission license, and in the present example, finds that it exceeds an upper limit value, to determine that the license has expired (2). Thereafter, the apparatus A searches the network for an apparatus possessing the normal transmission license (3).

If no such apparatus is found by the search, information in the system box and configuration information thereof are saved in association with each other until the normal transmission license is purchased. The user is inhibited from handling the documents when the documents are in the saved state. On the other hand, if the apparatus C possessing the normal transmission license is found by the search, the apparatus A inquires of the apparatus C whether or not a password is set for a system box of the apparatus C (4).

If the password is set, the apparatus C notifies the apparatus A of the fact. If the password is not set, the apparatus C also notifies the apparatus A of the fact (5).

Then, in the case where the password is set, the apparatus A sends the system box including received documents to the apparatus C together with configuration information associated therewith (6). The configuration information is necessary for operating the system box of the apparatus A, and includes a password and information for identifying the apparatus A, for example. The information (including the received documents) in the system box and the configuration information are saved in the apparatus C (7). The apparatus C stores the received information and configuration information in a new, additionally generated system box in distinction from documents originally stored in its own system box, thereby making it possible to use the documents transferred from the apparatus A under restrictions (8).

The following restrictions may be imposed at this time:
1. Reference to only properties (information on the sender of the received documents and reduced images) is permitted.
2. Normal use is permitted with a surcharge.
3. Only printout is permitted (once printed, the received document is erased).

On the other hand, in the case where the password is not set for the system box of the apparatus C, it is possible to store the received documents in the system box of the apparatus C, and therefore each of the received documents is transferred to the apparatus C together with its configuration information (including information on time of reception, the sender, and so forth, and information indicating that the document should be possessed by the apparatus A), and saved in the apparatus C in distinction from the documents originally stored in the apparatus C.

Figure 11A:
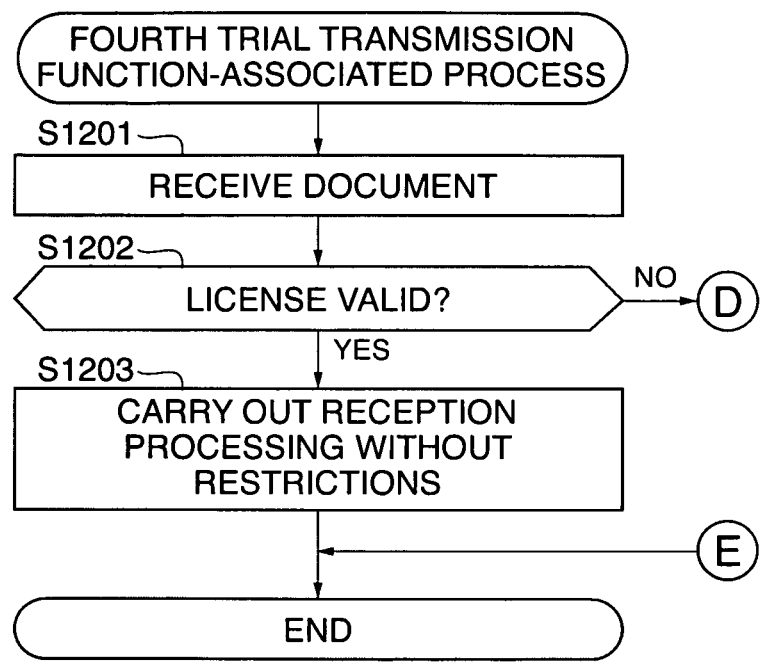
FIGS. 11A and 11B are flowcharts of the fourth trial transmission function-associated process carried out by a printing apparatus (apparatus A).
Figure 11B:
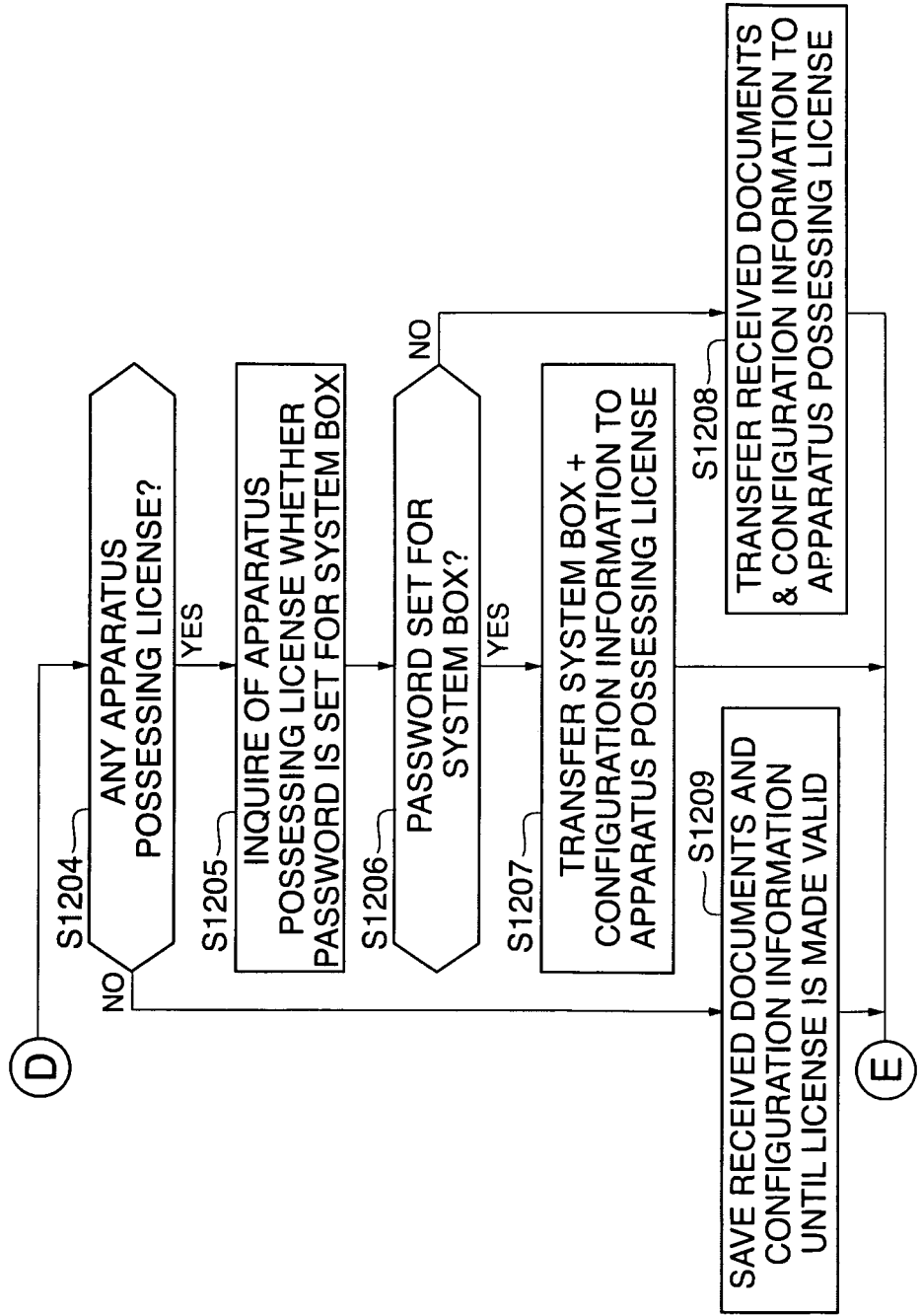

FIGS. 11A and 11B are flowcharts of the fourth trial transmission function-associated process, described with reference to FIG. 10, which is executed by the printing apparatus (apparatus A). This process is executed by the CPU 33 of the printing apparatus 100 (apparatus A) reading out a control program stored in the HDD 113 and executing the same.

First, in a step S1201, a document is received. Then, it is determined in a step S1202 whether or not the trial transmission license is still valid. If the trial transmission license is still valid, i.e. if there is any remaining number of times the license can be used, reception processing is executed without restrictions in a step S1203, followed by terminating the present process. More specifically, storage of the received document in the system box, transfer of the document to an external apparatus, printing of the same, etc. are permitted without restrictions, according to settings configured for the printing apparatus 100.

If it is determined in the step S1202 that there is no remaining number of times the license can be used, the process proceeds to a step S1204, wherein the LAN 101 is searched for an apparatus possessing the normal transmission license.

If an apparatus possessing the normal transmission license is present, the process proceeds to a step S1205, wherein the apparatus A inquires of the apparatus possessing the normal transmission license whether or not a password is set for the system box of the apparatus. It should be noted that when a plurality of apparatuses are found by the search in the step S1204, the apparatus A selects one from them and makes the inquiry to the selected one in the step S1205.

If a response indicating that a password is set for the system box is received from the apparatus possessing the normal transmission license in a step S1206, the process proceeds to a step S1207, wherein the apparatus A transfers the system box (including the received document) and the configuration information associated therewith to the apparatus possessing the normal transmission license, and causes the apparatus to store the transferred information in the HDD 113 thereof, followed by terminating the present process. It should be noted that in the step S1207, transfer of the information to the other apparatuses than the apparatus possessing the normal transmission license is inhibited.

If it is determined in the step S1206 that no password is set for the system box of the apparatus possessing the normal transmission license, the process proceeds to a step S1208, wherein the apparatus A transfers the documents in its own system box and configuration information associated with each of the documents to the apparatus possessing the normal transmission license, followed by terminating the present process.

If no apparatus possessing the normal transmission license is found on the network in the step S1204, the process proceeds to a step S1209. In the step S1209, the apparatus A saves the documents and the configuration information associated with each of the documents in its own system box (i.e. the apparatus A locks the information in the HDD 113 to prevent the user from handling the information) until the normal transmission license is made valid i.e. obtained, followed by terminating the present process. It should be noted that after the documents and the document-specific configuration information are saved, only the transmission function may be disabled, with the other processing (printing, deletion, etc.) enabled.

Further, when the documents and the configuration information are transferred to the external apparatus (the apparatus C in FIG. 10) in the step S1207 or S1208, the printing apparatus 100 as a sender apparatus (the apparatus A in FIG. 10) notifies the user of the apparatus as the transfer destination, by displaying information on the transfer on the operating section 112 or causing the printer unit 111 to output the information as a report. The user may be notified via the Web browser of the external apparatus. Further, when it is determined in the step S1206 that the system box has no password set therefor, the printing apparatus 100 may be configured to further make an inquiry as to whether or not it is required to set a password for each document, and send the passwords if they are required, in the step S1208.

Next, a description will be given of a fifth trial transmission function-associated process executed by a printing apparatus 100 corresponding to the apparatus C appearing in FIG. 10.

Figure 12A:
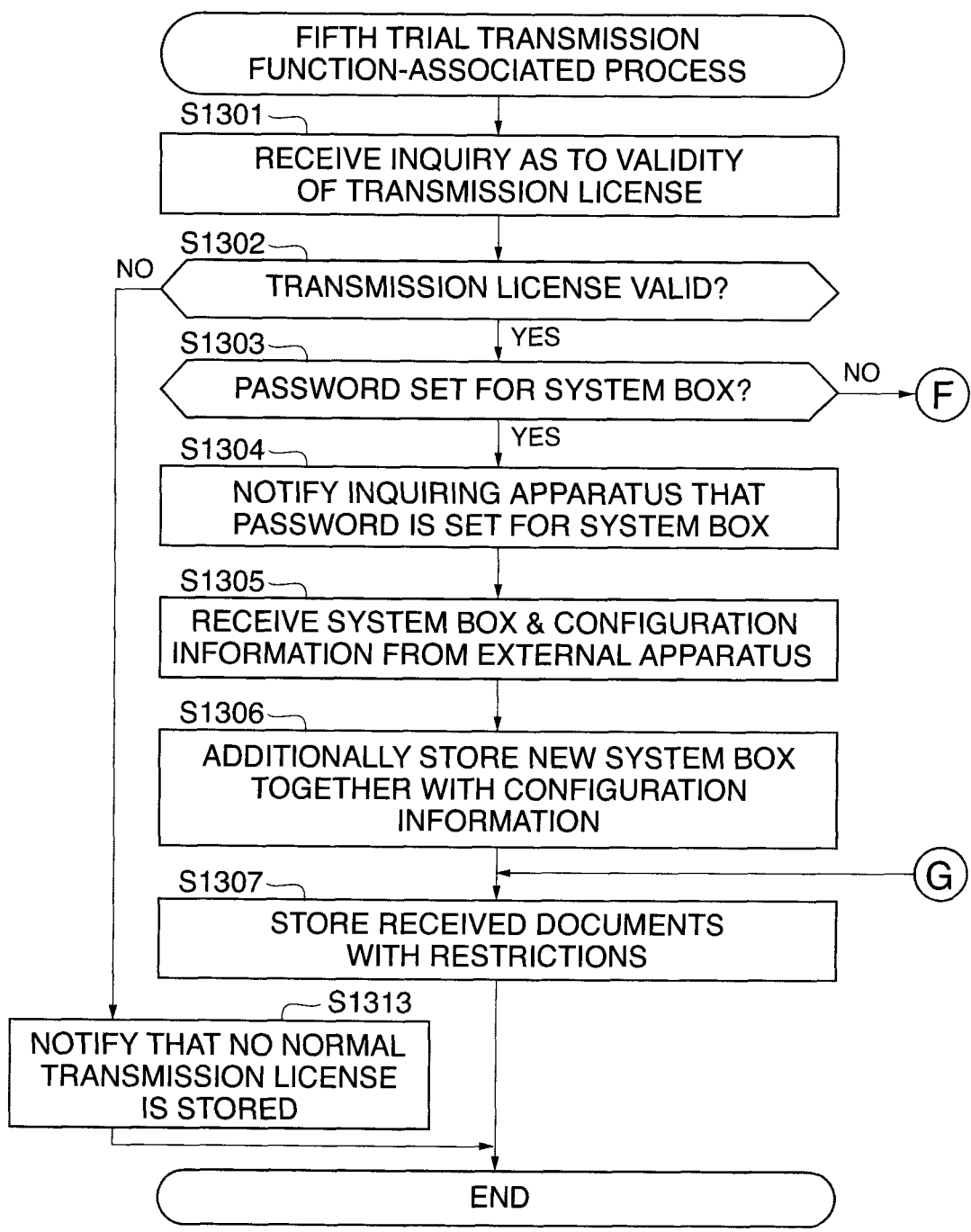
FIGS. 12A and 12B are flowcharts of the fifth trial transmission function-associated process carried out by a printing apparatus (apparatus C).
Figure 12B:
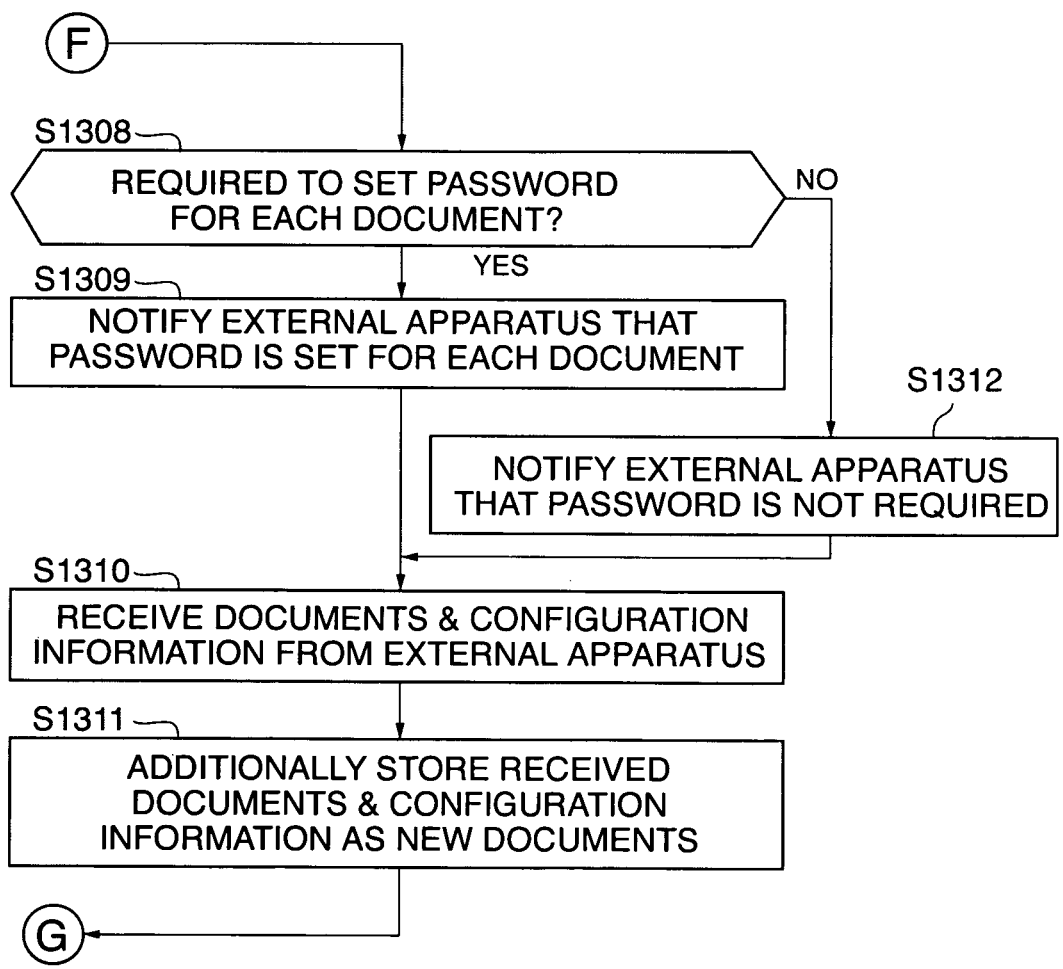

FIGS. 12A and 12B are flowcharts of the fifth trial transmission function-associated process. This process is executed by the CPU 33 of the printing apparatus 100 (apparatus C) reading out a control program stored in the HDD 113 and executing the same.

As shown in FIGS. 12A and 12B, the inquiry as to whether or not the printing apparatus 100 has the normal transmission license (i.e. the inquiry made in the step S1204) is received by the printing apparatus 100 (apparatus C) in a step S1301. Then, in a step S1302, the printing apparatus 100 searches the license management file in its own HDD 113 so as to determine whether or not the normal transmission license is stored. If the normal transmission license is stored, the process proceeds to a step S1303, wherein the printing apparatus 100 determines whether or not a password is set for its own system box.

If a password is set for the system box, the process proceeds to a step S1304, wherein the printing apparatus 100 notifies the inquiring apparatus (apparatus A) that a password is set for the system box.

In a step S1305, the printing apparatus 100 (apparatus C) receives the system box and the configuration information associated therewith (transmitted in the step S1207) from the notified apparatus (apparatus A). Then, in a step S1306, the printing apparatus 100 (apparatus C) generates a new system box and additionally stores the system box in the HDD 113 together with configuration information associated therewith. In a step S1307, the received documents are stored with restrictions on the available functions in the new system box, as documents from the apparatus whose license has expired, in a manner distinguished from documents originally stored in the apparatus C, followed by terminating the present process.

If it is determined in the step S1303 that no password is set for the system box, it is determined in a step S1308 whether or not it is required to set a password for each of the documents in the system box.

If it is required to set a password for each of the documents, the process proceeds to a step S1309, wherein the apparatus C notifies the inquiring apparatus (apparatus A) of the requirement. The apparatus C receives the documents and the configuration information associated with each of the documents (including passwords if required, which are transmitted in the step S1208) from the notified apparatus (apparatus A) in a step S1310, and additionally stores the documents as new documents in the system box together with the configuration information associated with each of the document in a step S1311. Then, the process proceeds to the step S1307.

If it is determined in the step S1308 that it is not required to set a password for each of the documents, the apparatus C sends a notification to the effect to the inquiring apparatus (apparatus A) in a step S1312, followed by the process proceeding to the step S1310.

If it is determined in the step S1302 that the normal transmission license is not stored, the inquiring apparatus (apparatus A) is notified of the fact in a step S1313, followed by terminating the present process.

Thus, even after the trial transmission license has expired, it is possible to save stored documents until the normal transmission license is purchased. Further, since the system box or documents in the system box are transferred to an external apparatus, it is also possible to continue to use the transmission function with restrictions. Furthermore, since configuration information (password) is added to each document, it is possible to use the transmission function while maintaining security.

As can be understood from the above, even after the trial transmission license has expired, it is possible to refer to and process data in the system box, with restrictions imposed thereon. Furthermore, by transferring the data in the system box to an external apparatus whose transmission license is valid, it is possible to continuously use the transmission function while maintaining security until the normal transmission license is purchased.

The present embodiment enables the user to check information in the system box even after the trial transmission license has expired, to thereby create an environment conducive to the purchase of the transmission license.

Further, according to the present embodiment, since the whole system box or documents in the system box can be transferred to an external apparatus together with configuration information associated therewith, it is possible to enable the user to use the transmission function of the external apparatus with restrictions (a surcharge, etc.), while maintaining security. This makes it possible to constantly provide the transmission function until the user purchases the normal transmission license.

In the above various examples, out of the license-managed communication functions, the transmission function is inhibited from being used, and the reception function is restricted in the processing associated therewith. However, instead of completely inhibiting the use of the transmission function, only transmission e.g. to a license management company may be permitted. This makes it possible to use the transmission function of the printing apparatus 100 exclusively for communication with the license management company.

Further, it is to be understood that the present invention may also be accomplished by supplying a system or an apparatus with a storage medium in which a program code of software, which realizes the functions of the above described embodiment, is stored, and causing a computer (or CPU or MPU) of the system or apparatus to read out and execute the program code stored in the storage medium.

In this case, the program code itself read from the storage medium realizes the functions of the above described embodiment, and therefore the program code and the storage medium in which the program code is stored constitute the present invention.

Examples of the storage medium for supplying the program code include a floppy (registered trademark) disk, a hard disk, a magnetic-optical disk, an optical disk, such as a CD-ROM, a CD-R, a CD-RW, a DVD-ROM, a DVD-RAM, a DVD-RW, or a DVD+RW, a magnetic tape, a nonvolatile memory card, and a ROM. Alternatively, the program may be downloaded via a network.

Further, it is to be understood that the functions of the above described embodiment may be accomplished not only by executing the program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to an exemplary embodiment, it is to be understood that the invention is not limited to the disclosed exemplary embodiment. The scope of the following claims is to be accorded the broadest interpretation so as to encompass all modifications, equivalent structures and functions.

This application claims priority from Japanese Patent Application No. 2007-296684 filed Nov. 15, 2007, which is hereby incorporated by reference herein in its entirety.

What is claimed is:

1. A data communication apparatus, comprising:
a computer;
a determination unit configured to determine whether or not a license associated with a transmission function for transmitting a data to an external apparatus and a storage function for storing a data, transmitted from another external apparatus, in a storage unit is valid; and
a control unit configured to take control,
when the determination unit determines that the license is valid, to permit execution of the transmission function and the storage function, and,
when the determination unit determines that the license is not valid, to inhibit execution of the transmission function and the storage function, but to permit execution of a function for printing a data transmitted from the another external apparatus without storing the data in the storage unit,
wherein the determination unit and the control unit are implemented at least in part by the computer.

2. The data communication apparatus according to claim 1, comprising an output unit configured to output a warning report when the determination unit determines that the license is not valid.

3. The data communication apparatus according to claim 1, wherein the control unit takes control to permit, when the determination unit determines that the license is valid, execution of a processing function for processing the data transmitted from the another external apparatus, and
wherein the control unit takes control to restrict, when the determination unit determines that the license is not valid, execution of the processing function.

4. The data communication apparatus according to claim 3, comprising a conversion unit configured to convert the data transmitted from the another external apparatus into a format enabling browsing of the received data via a Web browser, and
wherein when the determination unit determines that the license is not valid, the control unit takes control to permit the data converted into the format by the conversion unit to be browsed via the Web browser.

5. The data communication apparatus according to claim 3, wherein when the determination unit determines that the license is not valid, the control unit takes control to permit the data received using the reception function to transfer to an external apparatus having the license, but to inhibit the received data from being transferred to an external apparatus not having the license is inhibited.

6. A method of controlling a data communication apparatus, the method comprising the steps of:
determining whether or not a license associated with a transmission function for transmitting a data to an external apparatus and a storage function for storing a data, transmitted from another external apparatus, in a storage unit is valid; and
controlling,
when it is determined in the determining step that the license is valid, to permit execution of the transmission function and the storage function, and,
when it is determined in the determining step that the license is not valid, to inhibit execution of the transmission function and the storage function, but to permit execution of a printing function for printing a data transmitted from the another external apparatus without storing the data in the storage unit,
wherein the determining step and the controlling step are implemented at least in part by a computer of the data communication apparatus.

7. The method according to claim 6, wherein the controlling includes outputting a warning report, when it is determined that the license is not valid.

8. The method according to claim 6,
wherein the controlling step includes permitting, when it is determined in the determining step that the license is valid, execution of a processing function for processing the data transmitted from the another external apparatus, and
wherein the controlling step includes restricting, when it is determined in the determining step that the license is not valid, execution of the processing function.

9. The method according to claim 8, wherein the controlling includes permitting the data transmitted from the another external apparatus and converted into a format enabling browsing of the received data via a Web browser to be browsed via the Web browser, when it is determined that the license is not valid.

10. The method according to claim 8, wherein the controlling includes permitting the data received using the reception function to be transferred to an external apparatus having the license, and inhibiting the received data from being transferred to an external apparatus not having the license, when it is determined that the license is not valid.

11. A non-transitory computer-readable storage medium storing a program for causing a computer to execute a method of controlling a data communication apparatus, the method comprising the steps of:
determining whether or not a license associated with a transmission function for transmitting a data to an external apparatus and a storage function for storing a data, transmitted from another external apparatus, in a storage unit is valid; and
controlling,
when it is determined in the determining step that the license is valid, to permit execution of the transmission function and the storage function, and,
when it is determined in the determining step that the license is not valid, to inhibit execution of the transmission function and the storage function, but not to inhibit execution of a printing function for printing a data transmitted from the another external apparatus without storing the data in the storage unit.

* * * * *